Figure 4:
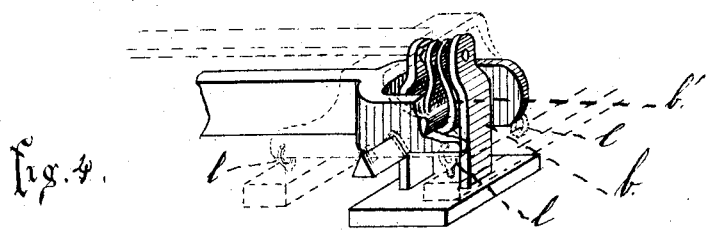
Figure 5:
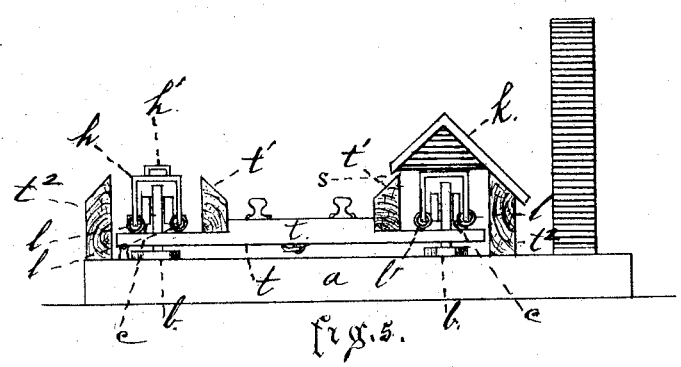
Figure 6:
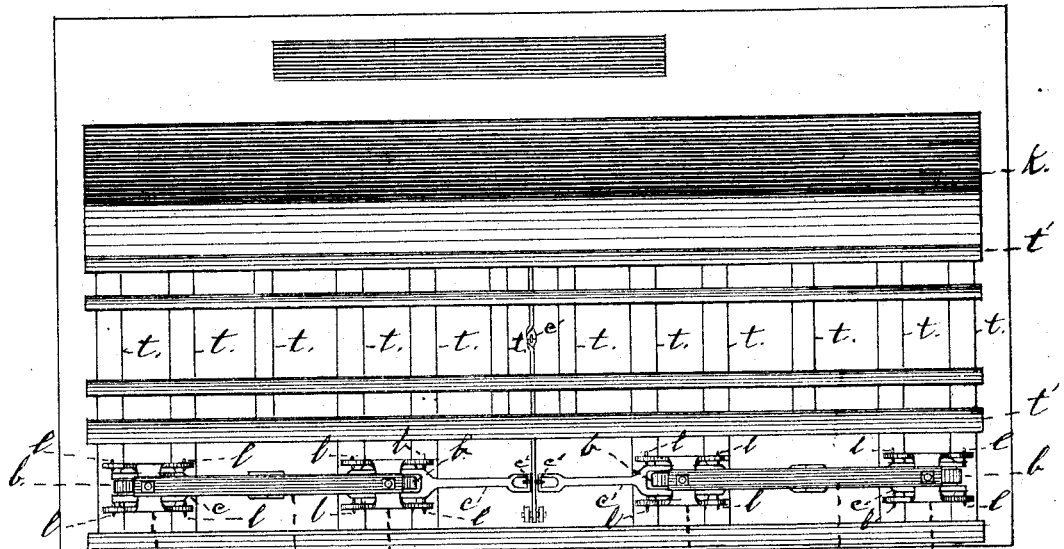

2 Sheets--Sheet 1.
J. F. KEELER.
Platform-Scales.
No. 139,897.    Patented June 17, 1873.
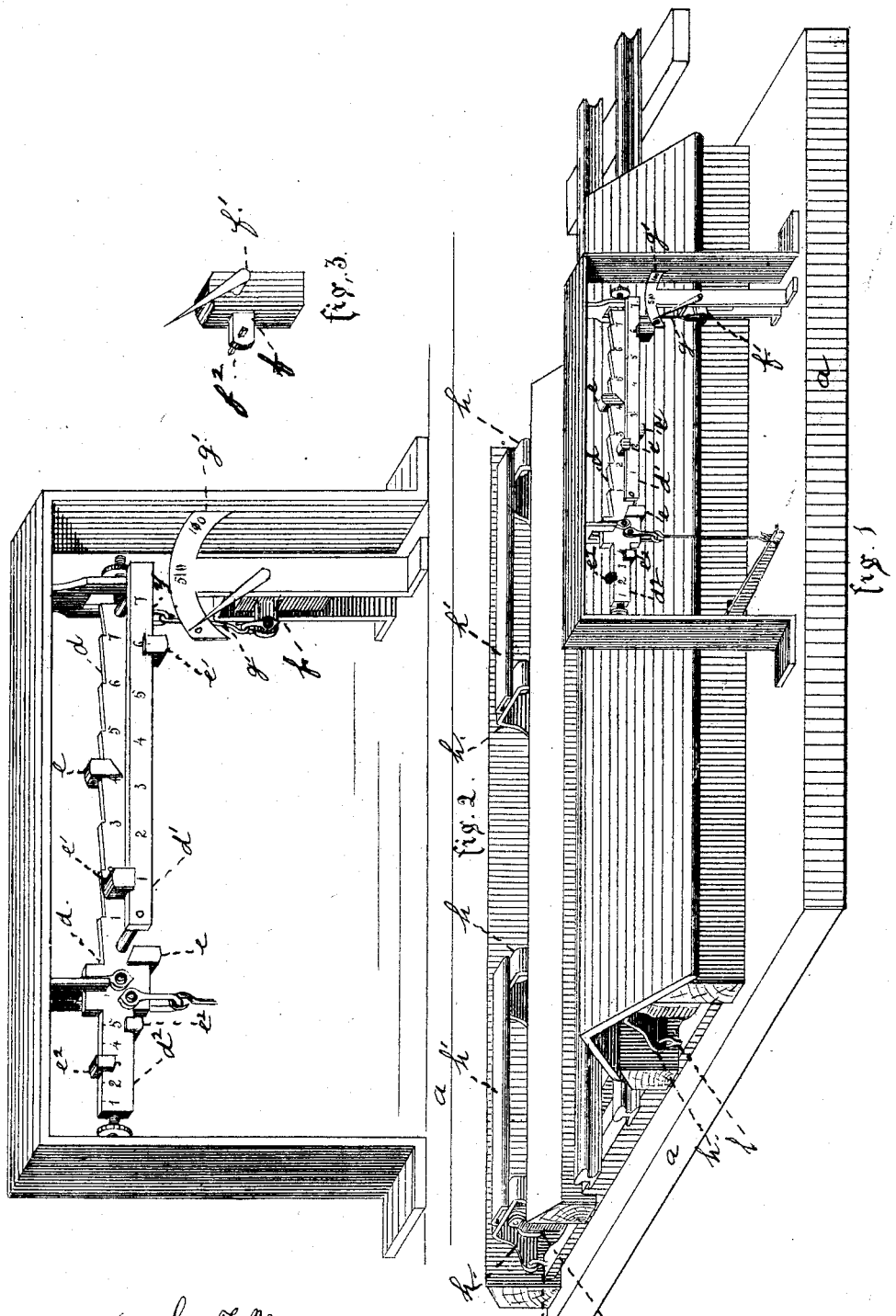
Witnesses: John J. Moore, R. Edwards
Inventor: Joel F. Keeler 2 Sheets--Sheet 2.

J. F. KEELER.
Platform-Scales.

No. 139,897. Patented June 17, 1873.

Witnesses: John J. Moore, R. Edmond

Inventor: Joel F. Keeler

AM. PHOTO-LITHOGRAPHIC CO. N.Y. (OSBORNE'S PROCESS.)

UNITED STATES PATENT OFFICE.

JOEL F. KEELER, OF PITTSBURG, PENNSYLVANIA.

IMPROVEMENT IN PLATFORM-SCALES.

Specification forming part of Letters Patent No. 139,897, dated June 17, 1873; application filed September 7, 1871.

*To all whom it may concern:*

Be it known that I, JOEL F. KEELER, of the city of Pittsburg, in the State of Pennsylvania, have invented a new and Improved Mode of Constructing Platform-Scales, especially those adapted to the weighing of wheeled vehicles, such as railroad cars, wagons, &c., which scales are invariably made of large timbers, or beams of wood or metal.

The nature of my invention is of a varied character, and comprises improvements in several important particulars, among which are—

First. Reducing the depth of the pit, or substantially obviating it altogether.

Second. Taking the platform levers of the scale out of the dampness of the pit and securing them against rust, and also placing them in an accessible position for adjustment and repairs by placing them in boxes on each side of the platform.

Third. Preventing the pit from being filled with snow and other material through the crevices around the platform.

Fourth. Rendering the scale more perfectly self-indicating than it has before been made.

Fifth. Preventing displacement of the weighing-levers, and wearing of the bearings and breakage of the scale from running fast trains of cars and other vehicles over it.

To enable others skilled in the art to make and use my invention, I will proceed to describe it more fully.

I make the machinery of the scale of any known style or pattern, but in order to avoid or obviate the need for a pit, so called, I place the longitudinal timbers of the platform in any known way, chiefly or wholly on the top of the platform, and bolt the same, or otherwise fasten them, to the platform, so as to give it material longitudinal support. In furtherance of the same object, and for preventing the rusting and destruction of the bearings, I place the main weighing levers chiefly or wholly above ground and at the sides of the platform in any known way and manner; but I prefer horizontal levers, though I use triangular or other levers, as occasion requires, and I connect the series of main levers $c$, located on each side of the platform with each other and with the vibrating-beam $d$, by means of the beam-levers, constructed in any known way.

In order to prevent jarring and displacement of the machinery, as well as unnecessary wear, I make a weighing-platform, or several of them, $h'$, of any known form and method, and place it, or them, on the platform pivots or bearings of the scale to sustain the weight to be weighed. I then suspend, by any known device, another, which I call the working-platform, $t$ and $t^1$, from the weighing-platforms. This working-platform receives all the shocks primarily of the vehicles or animals passing over it, and its oscillations are all made by its suspending devices $l$, (which usually are slightly elastic,) and not by the weighing-levers, as has hitherto been chiefly done. This prevents displacement of the weighing-levers, and also their oscillation upon and wear of the pivots and other bearings. By taking the machinery out of the pit, and by placing the longitudinal timbers chiefly above the platform, I greatly reduce the depth of the pit down to a few inches, even for heavy railroad-track scales. In order to prevent snow and other material from filling up the pit, I manage to make the cover $k$ for the levers and other machinery at the sides of the platform also to serve as a cover for the crevices on such sides, as shown at $s$. In order to fit the scale for indicating of itself the amount of weight placed on it on any given draft more perfectly than has hitherto been done, I connect the weighing-beam $d$ at the pivot $y$ with the weighted lever $f$ by the rod $g$ and pivot $f^2$. This is an improvement on the patent granted to me June 8, 1858, being much more simple and accurate. To prevent this lever from being lifted off from its bearings at $f^1$, (when indicating to its full capacity,) the upper part of the lever above its bearings or pivot is made or constructed in quite a heavy manner, and this extra weight counterbalances, whether the scale is standing still or in use, an equal amount of weight in that part of the lever below its bearings, and both together are sufficient to keep it on its bearings, while the excess of weight below is in such proportion that when the lever is being turned from its line of gravity it is rendered able to counterbalance and indicate the amount of load on the dial-plate which it is designed to weigh. It differs herein from the construction patented in 1858. $b$ are the link-stands that the weighing-levers rest in. $c'$ are links connecting the levers to each other, and $c$ are the main weighing-levers. $d$ is the main weighing-beam, and $d^1$ and $d^2$ are additional beams, each having two poises, $e$, $e^1$, and $e^2$, respectively. $f$ is the weighted lever operating on its fulcrum $f^1$ when moved by the beam $d$ through the connecting-rod $g$, pivoted to them, and thus indicating weight on the dial-plate $g'$. $h$ are chairs or female bearings resting on the pivots in the weighing-levers. $h^1$ are timbers or beams firmly fastened to two or more of the chairs $h$, and constituting with them an independent platform, of which there are one or more for each scale. In this case four are shown, two on each side of the scale. From these independent or primary platforms is suspended, by the links $l$, a swinging platform, $t\ t^1$, composed of the cross-ties $t$ and the longitudinal timbers $t^1$ bolted or otherwise fastened on the upper side and across the ends of the cross-ties. In case of wagon-scales, they are usually bolted on the upper side of the plank of the platform. This swinging platform is the working-platform of the scale. $k$ are covers to the machinery rising from the foundation-frame and projecting over the machinery and longitudinal timbers, forming a roof over them, protecting them from the weather. The space $s$, on the under side of this roof and over the timbers $t^1$, is to serve instead of the usual crevice between the side of the platform and the scale-frame, and is therefore elevated above the platform, and covered from the weather.

The advantages of this construction of scales consists in part in the following particulars, viz:

First. Reducing the usual depth of the pit heretofore required for this class of scales fits them for use in low grounds and flat sections of the country.

Second. Taking the machinery of a scale out of the pit and placing it above ground alongside of the platform, and protecting it from the weather, prevents rusting of the pivots especially, and thus, other things being equal, doubles the length of the life of the scale.

Third. Elevating the crevice around the platform, and covering it, fits the scale for use at coal-mines and in snowy countries better than heretofore.

Fourth. By constructing the weighted lever as described, it is greatly simplified, and less likely to weigh incorrectly than as previously made.

What I claim, is—

1. The longitudinal stringers $t'\ t'$, when placed chiefly or wholly above the cross-beams $t\ t$, and firmly fastened thereto, in combination with the main weighing-levers $c$ arranged along the side of the platform and above the level thereof, thereby reducing the depth of the pit, when the levers are covered by protecting boxes $t$, $t^1$, $t^2$, and $k$, substantially as described and set forth.

2. The improved weighted lever $f$, constructed and used substantially as described.

3. The swinging platform $t\ t'\ t'$ suspended from one or more intermediate platforms, substantially as described.

JOEL F. KEELER.

Witnesses:
 JOHN T. MOORE,
 GEO. NEUBERT.